Feb. 1, 1927.

S. E. ANDERSON 1,616,102

ELECTROMAGNETIC COUPLING DEVICE

Filed May 12, 1925

Inventor:
Sidney E. Anderson.
by ~~~~ Atty.

Patented Feb. 1, 1927.

1,616,102

UNITED STATES PATENT OFFICE.

SIDNEY E. ANDERSON, OF MAPLEWOOD, NEW JERSEY, ASSIGNOR, BY MESNE ASSIGNMENTS, TO WESTERN ELECTRIC COMPANY, INCORPORATED, A CORPORATION OF NEW YORK.

ELECTROMAGNETIC COUPLING DEVICE.

Application filed May 12, 1925. Serial No. 29,684.

This invention relates to coupling coils and particularly to improved coil mountings and apparatus for varying the inductive coupling between two circuits.

In the usual adjustment, such for example as is used in radio receivers, it has been found that the coupling value varies very rapidly upon approaching the position of minimum coupling. Since it is frequently desirable to use very close to the minimum value of coupling when receiving a nearby station, this rapid variation at adjustments close to minimum coupling is a decided disadvantage.

The principal object of this invention is to facilitate coupling adjustments of radio receivers by providing a method of securing coupling variation in small units per unit of rotation of the coil near the position of minimum coupling.

It has been shown by experiment that if two single layer solenoidal coils are placed end to end, with their axes parallel, the position of maximum coupling will be when the axes coincide. If the coils are now displaced at right angles to the axes, a position of zero magnetic coupling will theoretically be found when each coil just half overlaps the other, if the length of the coils is not considered. In practical application it is found that this position of minimum coupling generally occurs when the coils are overlapping somewhat less than one-half, and frequently when the coils are mutually tangent or only very slightly overlapping. In order to take care of this fact and to be sure that the position of minimum coupling is obtainable, and also in order to obtain the entire variation from minimum to maximum coupling with 180° of rotation of the coupling coil, it is desirable that the relative position of the coils be variable with respect to the axis of rotation. This may be accomplished by slotting the supports in the manner shown in the accompanying drawing.

A preferred form of the invention is one in which one coil is fixed to a shaft by which it may be rotated, while a second coil is fixed in position, but mounted in such a manner that its position relative to the rotatable coil may be slightly varied to compensate for small manufacturing variations.

In another embodiment of the invention both coils are mounted on slotted supports, so that the distance between the axes of the coils may be varied, by moving either or both coils, one of said coils being readily rotatable.

Figure 1:
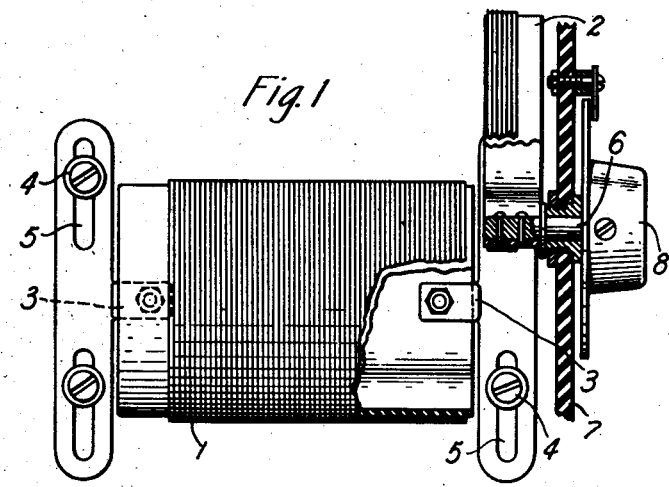
Figure 2:
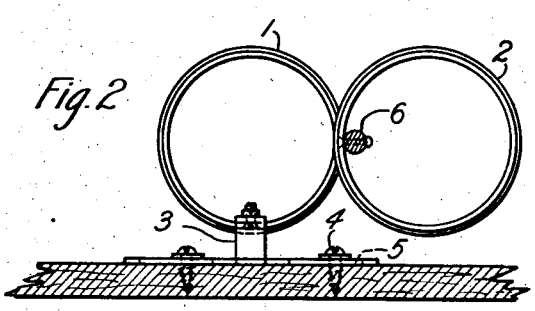
Figure 3:
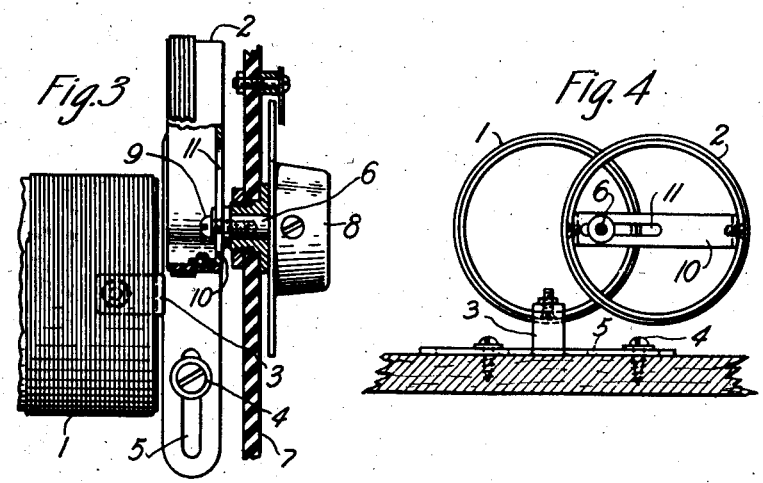
Figure 4:
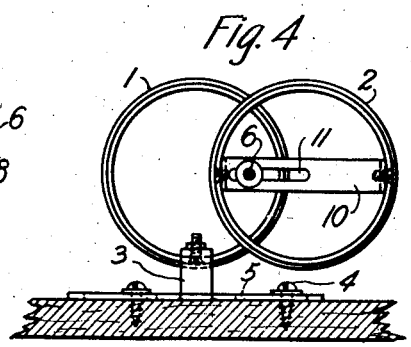

The invention will be more readily understood from the following detailed description when read in connection with the attached drawing, in which Fig. 1 and Fig. 2 are top and end views of one embodiment of the invention, while Fig. 3 and Fig. 4 are top and end views of a modified form of the invention.

In Fig. 1, stationary coil 1 is shown mounted upon supports 3 which in turn are fastened to any suitable base by screws 4 inserted in slots 5. It is readily apparent that the position of the stationary coil may be varied by a distance equal to the length of the slots.

Coil 2 is mounted upon shaft 6 which is fixed tangentially to the interior of said coil. Shaft 6 is shown extending through the casing or receiver front 7 and having at its outer end dial 8. By turning dial 8 coil 2 may be completely rotated through 360 degrees or from the position of approximate minimum coupling shown in Fig. 1 through the position of maximum coupling when the axes of the coils will be approximately coincident.

Fig. 2 is a schematic end view of the coupling coil arrangement disclosed in Fig. 1 showing the mounting of the coil. Supports 3 each have bent arms which are secured to the interior of the stationary coil. Coil 2 is shown fixed to shaft 6 about which it may be rotated. It is apparent that by adjusting the position of stationary coil 1, by means of screws 4, and without rotating coil 2, the coils may be made to assume a tangential position or to overlap each other by any desired degree.

Figs. 3 and 4 are descriptive of another embodiment of the invention in which both coils are mounted on slotted supports in such a manner that the distances between the axes of the coils may be varied by moving either or both coils. Coil 1 is mounted in the same manner as shown in Figs. 1 and 2. Coil 2 has fastened diametrically across its interior a supporting member 10, Fig. 4, slotted at 11. Shaft 6 passes through the slot and is adjustably secured to the supporting member by a screw as at 9 in Fig. 3, or by any other convenient means such as a nut secured to the shaft.

It is important in radio receiving circuits and often in other circuits that small values of coupling be employed, approaching in many cases, a very close to zero coupling. It is also important that small changes of coupling be possible at these low values of coupling, in other words, the coupling should vary by small increments and approach zero slowly rather than rapidly.

By reference to Fig. 4 it will be seen that, if the coil 2 is rotated about the shaft 6 from the position shown, the area of the coil 1 overlapped by the coil 2 changes very slowly during the first few degrees of rotation. As the rotation of the coil 2 is continued the change of coupling per degree rotation becomes larger as the coupling becomes larger thereby giving a percentage change of coupling which is approximately linear over the range of adjustment. It is especially important that the change of coupling is small at small values of coupling as this greatly facilitates the tuning of apparatus requiring fine adjustments of coupling, as for example, radio receivers.

The adjustment of coil 2 initially upon the pivot 6 permits an initial adjustment of the position of minimum coupling so that it may be made to occur exactly 180° from the position of maximum coupling, thereby facilitating adjustments to compensate for differences in coils due to manufacturing variations or other causes. In practice it has been found desirable for some purposes to have the coil adjustable from a position of almost one-half overlap of the coils to a position where they are almost tangent. In other instances adjustment may be made to the exact point of tangency or the coils may be initially set in tangent relation to each other.

While two possible arrangements of the coupling coil have been described in detail in this specification for the purpose of completely disclosing the present invention, it is to be understood that this invention is not limited thereto but only by the attached claims.

What is claimed is:

1. An inductive coupling device comprising two coils of circular section mounted with their axes parallel, rotatable means whereby the relative position of the coils may be varied from an approximate tangential position to a position such that the axes of the coils are approximately coincident, and means whereby the position of both coils may be linearly varied so as to vary the distance between their axes.

2. An inductive coupling device comprising two coils mounted with their axes parallel and capable of assuming an overlapping position, one of said coils being rotatable so as to rotate from an approximate tangential position to a position where the axes of the coils are approximately coincident and the other of said coils being capable of movement to or away from the first of said coils in such a manner that the distance between the axes of the two coils may be varied.

3. An inductive coupling device comprising a stationary coil and a rotatable coil, said coils having their axes parallel, and placed so as to be capable of assuming overlapping positions, means for mounting the rotatable coil whereby the said coil may be rotated through at least 180°, and means of support for the stationary coil, said means of support being devised so that the position of the fixed coil may be varied with respect to the point of rotation of the rotatable coil.

4. An inductive coupling device comprising a stationary coil and a rotatable coil, said coils having their axes parallel, and placed so as to be capable of assuming overlapping positions, means for mounting the rotatable coil whereby the said coil may be rotated through at least 180°, and means of support for both coils such that the position of either or both coils may be varied with respect to the point of rotation of the rotatable coil.

In witness whereof, I hereunto subscribe my name this 7 day of May A. D., 1925.

SIDNEY E. ANDERSON.